United States Patent [19]

Jones et al.

[11] 4,258,535

[45] Mar. 31, 1981

[54] SHIELDING STRUCTURE FOR ROTARY MOWER

[75] Inventors: William A. Jones, Fonthill; John Kulak, Fort Colborne, both of Canada

[73] Assignee: Deere & Company, Moline, Ill.

[21] Appl. No.: 41,858

[22] Filed: May 24, 1979

[51] Int. Cl.³ .............................................. A01D 55/26
[52] U.S. Cl. ....................................... 56/13.6; 56/503; 56/119; 56/320.1
[58] Field of Search ...................... 56/13.6, 53, 60, 61, 56/63, 119, 500, 503, 13.7, 320.1, 17.3, 17.4

[56] References Cited

U.S. PATENT DOCUMENTS

| 2,632,988 | 3/1953 | Pollard et al. | 56/53 |
|---|---|---|---|
| 2,977,741 | 4/1961 | Stroman | 56/25.4 |
| 3,121,302 | 2/1964 | Northcote et al. | 56/13.6 |
| 3,335,554 | 8/1967 | Grichnik | 56/119 |
| 3,577,871 | 5/1971 | Engler | 56/25.4 |
| 3,971,196 | 7/1976 | Stevenson | 56/17.4 |

OTHER PUBLICATIONS

"Farmhand 806 Shredder".

Primary Examiner—Robert A. Hafer

[57] ABSTRACT

A rotary mower shielding structure is provided for utilization in bedded row crops. The shielding structure is carried at the forward edge of the mower and has uniquely shaped openings compatibly spaced for row crops. The openings are designed to guide and support the row crop as it enters the cutting chamber of the mower to assure severing of the stalk near the crest of the bed. The shielding structure depends rearwardly and guides the stalk until contact with the blade, yet terminates forwardly of the blade to avoid interference when obstacles strike the shielding structure. Rigid material forms the structure to contain the severed stalks within the cutting chamber and assure thorough shredding.

3 Claims, 3 Drawing Figures

SHIELDING STRUCTURE FOR ROTARY MOWER

BACKGROUND OF THE INVENTION

The present invention relates generally to rotary mowers and more particularly relates to the shielding provided for the leading edge of such mowers.

Rotary mowers are commonly used to cut and shred roadside grass, underbrush and various types of agricultural crop materials. Rotary mowers used to cut agricultural row crop stalks subsequent to harvesting operations must operate over rows of stalks planted in mounds or beds and projecting from the crest of those mounds or beds. Typically planted in such rows are crops as cotton, maize, corn and sugar beets. As row crop stalks are cut by rotary mowing operations, the stalks are either bent forwardly as the mower housing advances over them or they are thrown to the side by the whirling blade. Accordingly, they are severed several inches above the bed or ground. Typically, a second cutting is then necessary to cut the stalk nearer to the ground and assure deterioration prior to the next planting season. If the height of the blade above the ground is adjusted downwardly to assure severing of the stalk adjacent the crest of the bed, it will often times contact the soil, resulting in damage to both the blade and mower drive.

Further, severed stalk material cannot be thoroughly shredded unless it is retained within the cutting chamber of the mower. Neither the chain nor rubber shielding presently provided at the forward edge of rotary mowers contain the stalks within the shredding chamber nor do they guide or support the stalk as it enters the mower to assure that it is severed closely adjacent the bed.

SUMMARY OF THE INVENTION

The present invention overcomes these problems and provides a rigid mower shielding structure that guides and supports the row crop stalk as it enters the mower cutting chamber to assure that it is cut near the crest of its bed. This shielding structure further contains the severed stalk within the cutting chamber to assure thorough shredding.

The row crop stalks enter through an opening in the shielding structure which is formed by edges located closely adjacent the stalk. The vertical edges of the shield opening prevent the stalks from bending to the side as they enter the cutting chamber and from being thrown to the side as the blade contacts them. The opening further has a top edge that is spaced above the circular path of the cutting blade and therefore minimizes forwardly bending of the stalk as the mower passes over it prior to cutting action by the blade. With this opening configuration, the blade is able to contact the stalk at a point closer to the crest of the bed and minimize the need for additional subsequent cuttings.

The vertical edges forming the opening for row crop stalk entry are laterally spaced from the stalk, yet closely adjacent the bed. The shielding also extends into the troughs between the laterally spaced beds and further serves to contain the severed crop material within the cutting chamber for improved shredding. It is further formed of rigid material to better contain the severed crop material within the cutting chamber and assure thorough shredding.

The shielding extends downwardly and rearwardly to form with the side shields a smaller cutting and shredding chamber, yet it terminates just forward of the blade path in order to reduce possible interference between it and the blade in the event that it is pushed up by a rock or similar obstacle.

DESCRIPTION OF THE PREFERRED EMBODIMENT

Figure 1:
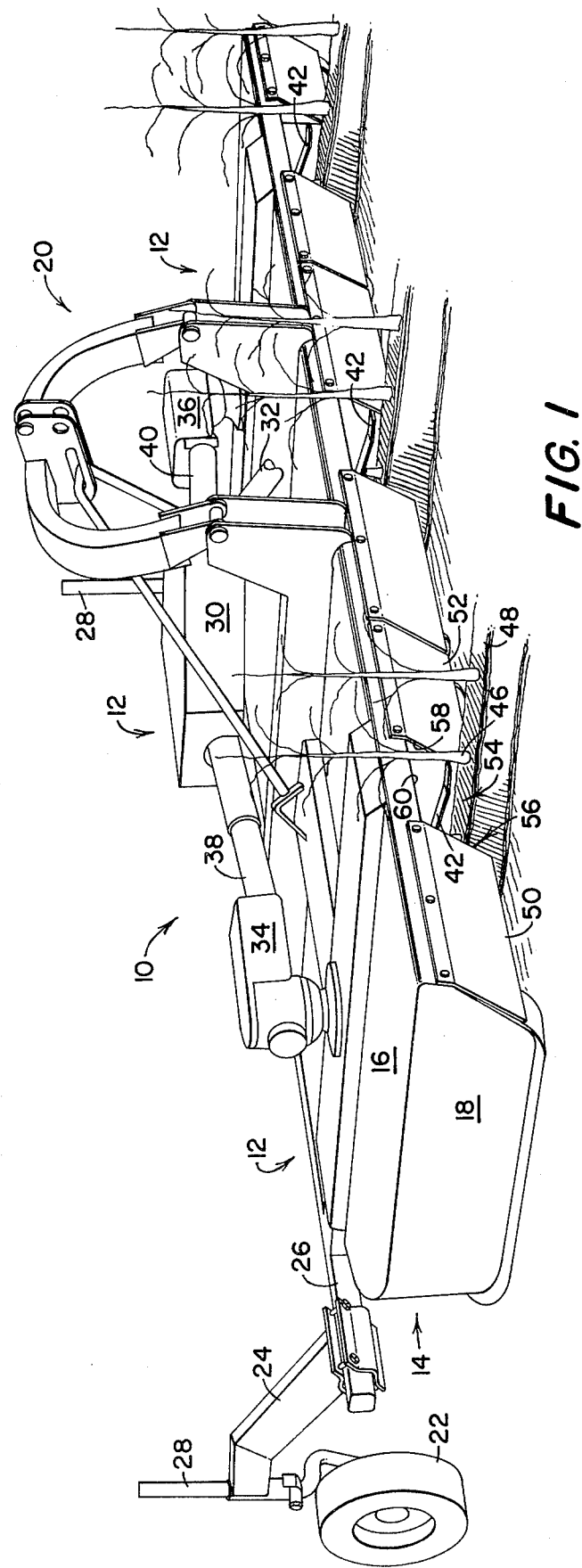
FIG. 1 is a front side perspective of a rotary mower utilizing the invention.

Looking now to FIG. 1, the invention is illustrated on a rotary mower 10 adapted for utilization behind a tractor or similar mobile towing vehicle. The mower 10 is composed of three individual cutter sections 12 rigidly joined together. Each cutter section 12 is essentially the same as its adjacent section.

The mower 10 includes a transversely elongated housing 14 having a flat top portion 16 and depending side walls 18. A hitch assembly 20 is fixed to and extends forwardly from the front of the housing 14 and is adapted at its forward end for connection with the drawbar of a tractor. The rear of housing 14 is supported on ground-engaging wheels 22 carried at the rearwardly end of support arms 24. The arms 24 in turn are fixed at their forward ends to a laterally extending bar 26 carried on the housing 14 and are shiftably adjustable along the bar 26. The wheels 22 are carried on vertically adjustable bars 28 to permit the operator to raise and lower the housing 14 and cutter blades relative to the ground.

The housing 14 carries along its top surface a central gear box 30 that can be coupled through shaft 32 (partially shown) with a power take-off shaft of a tractor. Each adjacent cutter section 12 is also provided with a gear box 34 and 36 that is in turn driven by a respective shaft 38 and 40 coupled with the central gear box 30. Projecting through the housing into each section and from its respective gear box is a shaft (not shown) that is drivingly coupled with respective rotary cutting blades 42. The power for driving each blade 42 is transmitted from the power take-off shaft of the tractor through the shaft 32 to the central gear box 30 and to each adjacent gear box 34, 36 and their respective blades 42.

The improvement resides in a shielding structure 44 fixed to the leading edge of each cutter section 12. As is apparent in FIG. 1, each rotary cutting section 12 has an essentially identical shielding structure 44 fixed to its leading edge. This structure 44 is specifically designed for use in cutting the stalks 46 of row crops planted in beds or mounds 48 and it is designed to guide the stalks 46 into the blade cutting chamber, support them during cutting and to retain them within the rotary cutting chamber for subsequent shredding.

Figure 2:
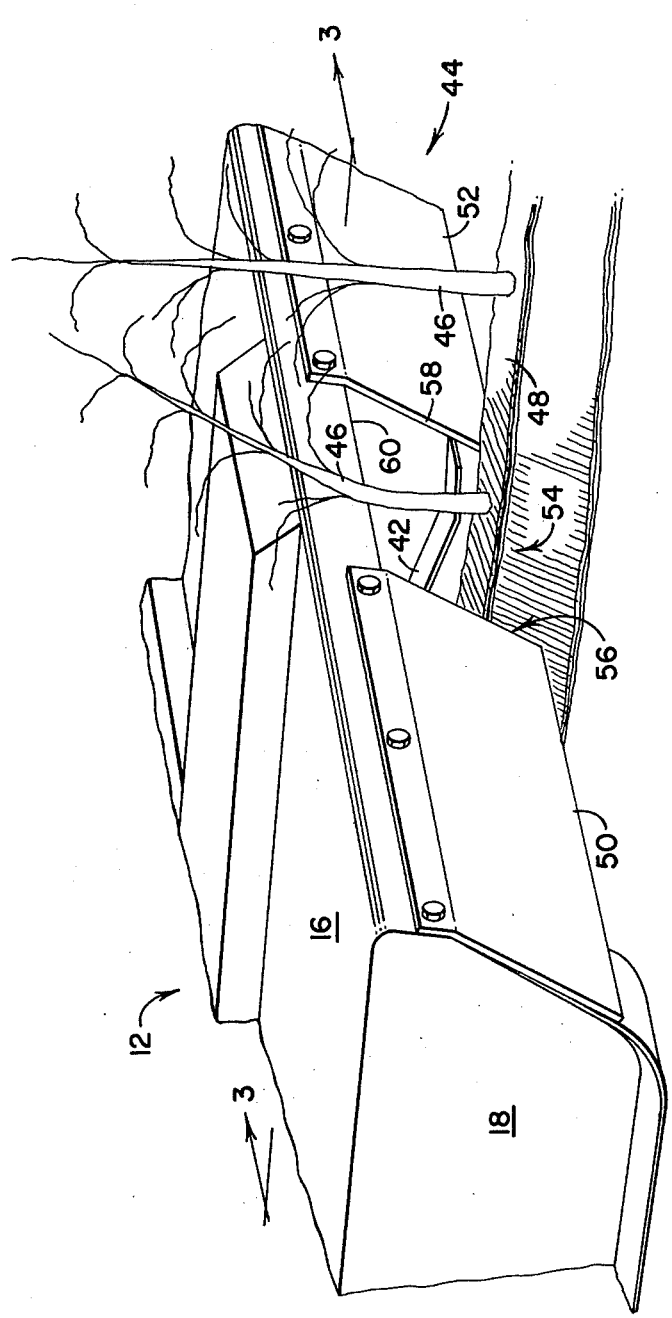
FIG. 2 is an expanded view of the shielding illustrated on the nearest cutter section illustrated in FIG. 1.

An expanded view of the shielding structure 44 is provided in FIG. 2. The preferred structure is composed of two separate rigid members 50 and 52 forming an opening 54 therebetween. However, a single member with an opening formed therein could also be utilized. The opening 54 is generally rectangular in shape and is formed by vertically extending and spaced apart adjacent edges 56 and 58 on members 50, 52 and a downwardly extending and generally horizontal lip or edge 60 of the housing 14. The vertical edges 56 and 58 are spaced apart in the preferred embodiment a distance of approximately 14 inches for use in cotton stalk cutting and the opening has a vertical dimension of approximately 5 inches. Other size openings could be effective for other crops and other various size bedding arrangements.

Figure 3:
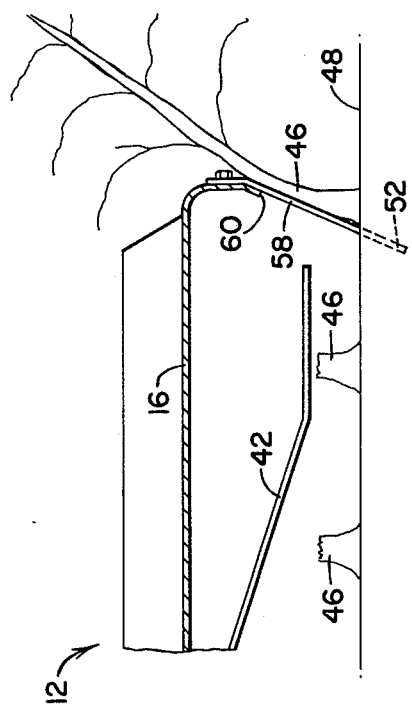
FIG. 3 is a view of the mower illustrated in FIG. 2 taken along line 3—3 and showing the shield configuration relative to the blade and stalk position as it enters the cutting chamber.

Looking now to FIG. 3, there is illustrated a cutaway side view taken along lines 3—3 of FIG. 2. This figure illustrates the shape of the shielding structure 44 and the relative locations of the edges 58 and 60 of the opening and the cutting blade 42. While the preferred embodiment illustrated aligns the three openings 54 with the leading edge of the paths of the respective blades, four rows or more could be cut with the same three cutting sections 12 by realigning the desired number of shields and openings across the front of the mower 10. While such realigned openings would not be placed directly at the leading edge or periphery of each blade path, the shielding structure edges 56, 58 and 60 would nevertheless guide and support the stalks 46 until they were close enough to the blade path to be severed low to the crest of the bed.

The shielding members 50 and 52 extend rearwardly from their top portions at an angle of approximately 35° in the preferred embodiment and terminate forwardly of a vertical plane passing through the tip of the cutting blade 42 when it extends fore-and-aft. Further, the horizontal edge 60 forming the top of the opening 54 is positioned above the plane of rotation of the cutting blade tip.

In operation, the rotary mower 10 is advanced over the field to shred the stalks of the harvested crop. Each opening 54 is aligned with a row of stalks 46 and is positioned over the bed 48 from which the stalks extend. Since the members 50 and 52 shield the low troughs between the mounds, the stalks are contained with the cutting chamber of the cutting section 12 for thorough shredding. As the cutting section 12 is advanced along the row and the stalks enter the opening 54, the vertical edges 56 and 58 of the opening confine the stalks from bending to one side or the other. The top edge 60 is close to the blade path and thus prevents them from bending too far forwardly before the blade tip contacts them. The trailing edges of the shielding members 50 and 52 terminate just forwardly of the blade path adjacent to them and thus act to restrict sideways movement of the stalk 46 until nearly the instant when it is contacted by the blade tip. Accordingly, the stalk 46 is severed very near to the crest of the bed 48 and the need for subsequent cuttings is eliminated.

We claim:

1. A mower having:
    a substantially horizontal housing;
    a generally vertical shaft carried by the housing and projecting therebelow;
    a material-cutting blade fixed to the shaft and rotatable therewith, the tips of said blade following a generally horizontal and circular path;
    shaft drive means mounted on the housing and powered by a mobile power source; and
    an improved shielding sturcture carried at the forward edge of the housing comprising:
    a substantially horizontally extending upper portion having a lower edge terminating above the path of the blade tips;
    horizontally spaced apart lower portions depending from the upper portion with adjacent lower portions having adjacent edges extending downwardly from the upper portion and forming therewith an opening for permitting passage of bedded crop material therethrough, said edges further being inclined rearwardly from the upper portion and terminating just ahead of the forward edge of said path of the blade tips.

2. A mower adapted to cut stalks of bedded crops comprising:
    a rigid housing having a substantially horizontal top portion and upright side portions depending therefrom and terminating adjacent the ground so as to be at each side of said bed;
    drive means mounted on the top portion and including an upright driven shaft extending therethrough;
    a blade connected to the lower end of said shaft for rotation therewith, the tips of said blade following a generally horizontal and circular path; and
    shielding structure carried along the forward edge of the top portion, extending downwardly and rearwardly therefrom, and terminating just forwardly of the path of said tips, said structure further including a fore-and-aft opening through which the bedded crop may pass, the top of said opening being formed by an edge vertically spaced above the forward periphery of said path and the sides of said opening being formed by downwardly and rearwardly extending edges that terminate forwardly of said blade and are spaced to each side of said bedded crop for guiding it as it passes therethrough.

3. A mower adapted to cut and shred stalks of bedded row crop material comprising:
    a substantially horizontal housing including a top and depending side shield terminating adjacent to the ground;
    drive means mounted on the top and including an upright driven shaft extending therethrough;
    a blade connected to the lower end of the shaft for rotation therewith, the tips of said blade following a generally horizontal and circular path; and
    shielding structure for guiding and supporting said stalks as the mower passes over them, including a generally horizontal housing edge carried across the forward portion of the top, depending therefrom and terminating above the path of the blade tips; and
    a plurality of spaced apart shielding members depending from the housing edge, inclined rearwardly therefrom and terminating forwardly of said path, the adjacent edges of each pair of adjacent shielding members forming with said housing edge an opening through which said stalks may pass and be guided to said blade and supported for cutting by said blade.

* * * * *